US011955691B2

(12) United States Patent
Cha et al.

(10) Patent No.: US 11,955,691 B2
(45) Date of Patent: Apr. 9, 2024

(54) ELECTRONIC DEVICE INCLUDING ANTENNA MODULE

(71) Applicant: Samsung Electronics Co., Ltd., Gyeonggi-do (KR)

(72) Inventors: Taekwan Cha, Gyeonggi-do (KR); Yongwon Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 17/702,875

(22) Filed: Mar. 24, 2022

(65) Prior Publication Data

US 2022/0344795 A1 Oct. 27, 2022

Related U.S. Application Data

(63) Continuation of application No. PCT/KR2022/003572, filed on Mar. 15, 2022.

(30) Foreign Application Priority Data

Apr. 23, 2021 (KR) ........................ 10-2021-0052866

(51) Int. Cl.

*H01Q 1/22* (2006.01)
*H01Q 1/24* (2006.01)
*H01Q 1/48* (2006.01)

(52) U.S. Cl.

CPC ............. *H01Q 1/2266* (2013.01); *H01Q 1/48* (2013.01)

(58) Field of Classification Search

CPC .......... H01Q 1/22; H01Q 1/2266; H01Q 1/24; H01Q 1/243; H01Q 1/1207; H01Q 1/48
See application file for complete search history.

(56) References Cited

U.S. PATENT DOCUMENTS 7,986,272 B2 7/2011 Kurashima et al.
8,526,170 B2 9/2013 Nishikawa et al.
(Continued)

FOREIGN PATENT DOCUMENTS

CN 203722621 U 7/2014
JP 2019-080095 A 5/2019
(Continued)

OTHER PUBLICATIONS

Written Opinion dated Jun. 20, 2022.
International Search Report dated Jun. 20, 2022.

*Primary Examiner* — Hoang V Nguyen
(74) *Attorney, Agent, or Firm* — Cha & Reiter, LLC

(57) ABSTRACT

An electronic device according to an embodiment of the disclosure may be configured to include a housing including a conductive plate and a non-conductive plate, a reinforcing member disposed at a first part inside the housing and including a groove of a predetermined length, a printed circuit board disposed at a second part different from the first part inside the housing, an antenna module disposed at one surface of the reinforcing member and including a ground layer at the rear surface thereof, and a signal connection member configured to electrically connect the printed circuit board and the antenna module, wherein a part of the signal connection member extends through the groove and is electrically connected to a first area of the ground layer in the groove by using a solder. Other various embodiments are possible.

20 Claims, 8 Drawing Sheets

(56) References Cited

U.S. PATENT DOCUMENTS

| | | | | |
|---|---|---|---|---|
| 9,748,660 | B2 | 8/2017 | Hwang et al. | |
| 10,003,125 | B2 | 6/2018 | Yoon et al. | |
| 2008/0167073 | A1 * | 7/2008 | Hobson | H01Q 13/10<br>455/557 |
| 2011/0148734 | A1 | 6/2011 | An et al. | |
| 2018/0359845 | A1 * | 12/2018 | Park | H01P 3/085 |
| 2019/0058244 | A1 | 2/2019 | Kim et al. | |
| 2020/0203836 | A1 | 6/2020 | Park et al. | |
| 2020/0259243 | A1 | 8/2020 | Jeon et al. | |

FOREIGN PATENT DOCUMENTS

| | | | | | |
|---|---|---|---|---|---|
| KR | 10-2007-0044140 | A | | 4/2007 | |
| KR | 10-0720939 | B1 | | 5/2007 | |
| KR | 20-0444101 | Y1 | | 4/2009 | |
| KR | 10-2011-0108663 | A | | 10/2011 | |
| KR | 10-2012-0001390 | A | | 1/2012 | |
| KR | 10-1326111 | B1 | | 11/2013 | |
| KR | 1020160084191 | A | * | 7/2016 | H01Q 1/24 |
| KR | 10-2019-0020349 | A | | 3/2019 | |
| KR | 10-2020-0077743 | A | | 7/2020 | |
| KR | 10-2020-0098145 | A | | 8/2020 | |

* cited by examiner

ELECTRONIC DEVICE INCLUDING ANTENNA MODULE

CROSS-REFERENCE TO RELATED APPLICATION(S)

This application is a continuation of International Application No. PCT/KR2022/003572, filed on Mar. 15, 2022, which claims priority to Korean Patent Application No. 10-2021-0052866, filed on Apr. 23, 2021 in the Korean Intellectual Property Office, the disclosures of which are herein incorporated by reference.

TECHNICAL FIELD

One or more embodiments of the instant disclosure generally relate to an electronic device including an antenna module.

BACKGROUND

There has been increasing use of electronic devices such as smartphones, laptops, and tablet PCs, and these electronic devices have been developed to provide various functions such as messaging, voice calls, image and video capture, etc.

An electronic device may be used for telephone communication with another electronic device through wireless communication and to transmit/receive various types of data.

Electronic devices may provide, for example, services such as GPS (global positioning system), Wi-Fi, LTE (long-term evolution), NFC (near field communication), Bluetooth, and/or MST (magnetic stripe transmission) communication.

An electronic device (for example, smartphone, laptop, or tablet PC) may include at least one antenna module in order to provide the user with various wireless communication services.

The antenna module may be electrically connected to a controller (for example, processor or wireless communication module) disposed on a printed circuit board (PCB), and may perform as an antenna for transmitting/receiving radio signals.

The antenna module may be electrically connected to the controller by using a signal connection member such as a coaxial cable.

If the signal connection member for electrically connecting the antenna module and the controller is electrically affected by another electronic component, radiation performance of the antenna module may be degraded.

If the connection point (for example, contact point) between the antenna module and the controller is exposed to the outside (e.g. outside of the PCB), the exposed part may be damaged or may contact another electronic component (for example, battery), which may cause degradation.

Technical problems to be solved by the disclosure are not limited to the above-mentioned technical problems, and other technical problems not mentioned herein will be clearly understood from the following description by those skilled in the art to which the disclosure pertains.

SUMMARY

An electronic device according to an embodiment of the disclosure may include a housing including a conductive plate and a non-conductive plate, a reinforcing member disposed at a first part inside the housing and including a groove of a predetermined length, a printed circuit board disposed at a second part different from the first part inside the housing, an antenna module disposed at one surface of the reinforcing member and including a ground layer at the rear surface thereof, and a signal connection member configured to electrically connect the printed circuit board and the antenna module, wherein a part of the signal connection member extends through the groove and is electrically connected to a first area of the ground layer in the groove by using a solder.

An electronic device according to an embodiment of the disclosure may include a housing including a conductive plate and a non-conductive plate, a reinforcing member disposed at a first part inside the housing and including a groove of a predetermined length, a printed circuit board disposed at a second part different from the first part inside the housing, an antenna module disposed at one surface of the reinforcing member and including a ground layer at the rear surface thereof, and a signal connection member configured to electrically connect the printed circuit board and the antenna module, wherein a part of the signal connection member extends through the groove and is electrically connected to a first area of the ground layer in the groove by using a solder, and wherein the part of the signal connection member is disposed between the reinforcing member and the antenna module.

According to certain embodiments of the disclosure, a grooved reinforcing member (for example, non-conductive injection-molded material) may be disposed on a surface of an antenna module and extend by a predetermined length such that rigidity of the electronic device and radiation performance of the antenna module can be secured without affecting other electronic components.

Various other advantageous effects identified explicitly or implicitly through the disclosure may be provided.

BRIEF DESCRIPTION OF DRAWINGS

In connection with the description of the drawings, the same or similar reference numerals may be used for the same or similar components.

DETAILED DESCRIPTION

Certain embodiments of the disclosure may provide an electronic device where a part of ground area (for example, second area) of an antenna module is electrically connected to a conductive area (for example, conductive plate) of a housing, and a contact point is configured in a part of the ground area (for example, first area) of the antenna module, thereby securing radiation performance of the antenna module.

Certain embodiments of the disclosure may provide an electronic device where a signal connection member is disposed between a grooved reinforcing member and an antenna module such that, without affecting other electronic components (for example, battery), rigidity of the electronic device and radiation performance of the antenna module can be secured.

Figure 1:
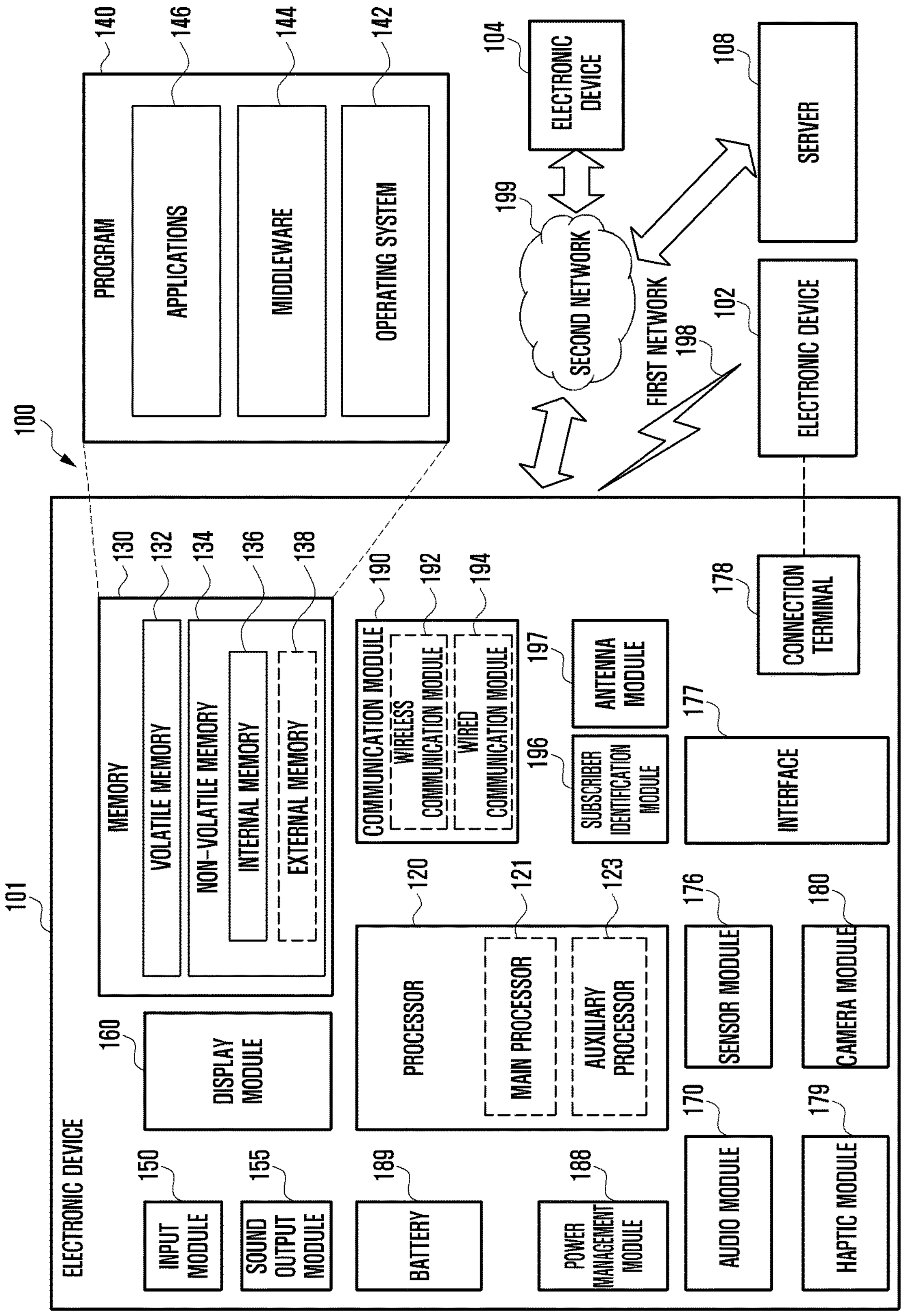
FIG. 1 is a block diagram of an electronic device in a network environment according to an embodiment of the disclosure.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Figure 2:
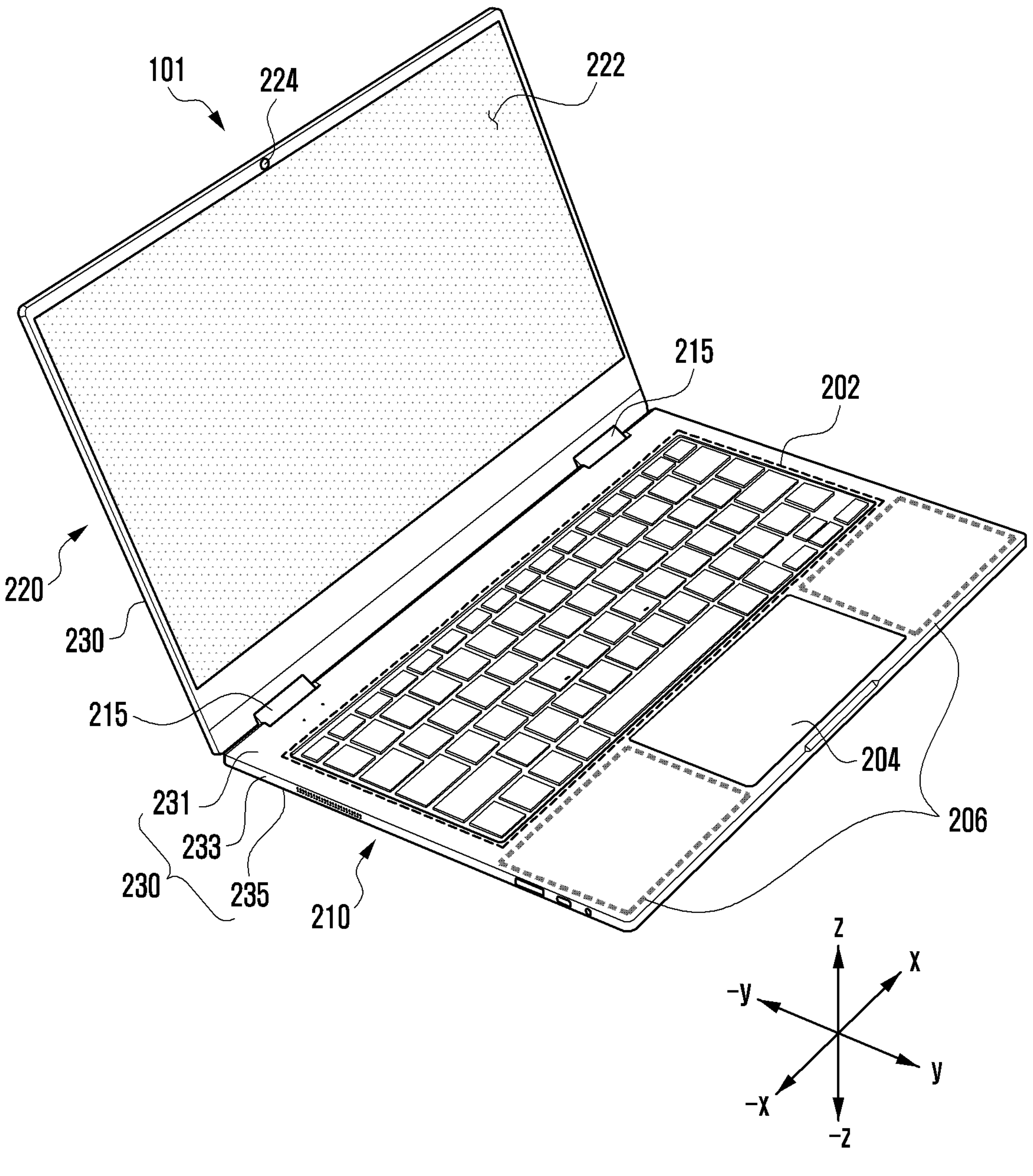
FIG. 2 is a perspective view schematically illustrating an electronic device according to an embodiment of the disclosure.

FIG. 2 is a perspective view schematically illustrating an electronic device according to an embodiment of the disclosure.

According to an embodiment, the electronic device 101 of FIG. 2 is a laptop but the instant disclosure is not limited thereto, and can be applied to various types of electronic devices such as bar-type device, foldable-type devices, rollable-type devices, or siding-type smartphones or tablet PCs.

Referring to FIG. 2, the electronic device 101 according to an embodiment of the disclosure may include a main body 210, a hinge unit 215, a display unit 220, and a housing 230.

According to an embodiment, the main body 210 may include a keyboard 202, a touch pad 204, and/or a palm rest 206.

According to an embodiment, the keyboard 202 (e.g., an input module 150 in FIG. 1) may be configured to have a plurality of keys at an upper portion (e.g., a z-axis direction) of the main body 210. The keyboard 202 may be a component for receiving number or character information. The keyboard 202 may include a plurality of input keys and function keys configured to initiate various functions of the electronic device 101. The function keys may include keys such as a shortcut key, a volume key, and directional keys which are configured to perform specific functions. The keyboard 202 may include one of a query keypad, a 3*4 keypad, a 4*3 keypad, or a touch key.

According to an embodiment, the touch pad 204 may replace the function of a mouse. The touch pad 204 may be used to input a command for executing or selecting an application and/or various screens displayed through the display unit 220.

According to an embodiment, the palm rest 206 may be a rest for reducing fatigue of the wrist of the user of the electronic device 101 while using the keyboard 202.

According to an embodiment, the hinge unit 215 may couple the main body 210 and the display unit 220 so the two are capable of being folded or unfolded. The hinge unit 215 may include a hinge module configured to mechanically connect the main body 210 and the display unit 220. The hinge unit 215 may include a flexible printed circuit board (FPCB) configured to electrically connect the main body 210 and the display unit 220 therein.

According to an embodiment, the display unit 220 may include a screen 222 (e.g., a display module 160 in FIG. 1) and a camera module 224 (e.g., a camera module 180 in FIG. 1).

According to an embodiment, the screen 222 may display information input by the user or information to be provided to the user and various menus of the electronic device 101. The screen 222 may include at least one of a liquid crystal display, an organic light emitted diode, an active matrix organic light emitted diode, a flexible display, or a transparent display. The screen 222 may provide various screens according to the use of the electronic device 101, such as a home screen, a menu screen, a lock screen, a game screen, a web page screen, a call screen, and a music or video play screen.

According to an embodiment, the camera module 224 may take still images or moving images. The camera module 224 may include one or more lenses, image sensors, image signal processors, or flashes.

According to an embodiment, the housing 230 may form the exterior of the main body 210. The housing 230 may be made of a conductive material (e.g., metal) and/or a non-conductive material (e.g., polymer). The housing 230 may include the palm rest 206 of the main body 210. The housing 230 may protect electronic components (e.g., processor 120, memory 130, sensor module 176, power management module 188, and/or battery 189 in FIG. 1) included in the main body 210.

According to an embodiment, the housing 230 may include a first surface 231 (e.g., upper surface) disposed in a first direction (e.g., the z-axis direction) of the main body 210, a second surface 235 (e.g., lower surface) disposed in a second direction (e.g., a −z-axis direction) which is the direction opposite to the first surface 231, and a side surface surrounding the space between the first surface 231 and the second surface 235.

According to an embodiment, the housing 230 may form the exterior of the display unit 220. The housing 230 may protect the camera module 224 and the screen 222 included in the display unit 220. The housing 230 may protect electronic components (e.g., sound output module 155 and/or audio module 170 in FIG. 1) included in the display unit 220.

Figure 3:
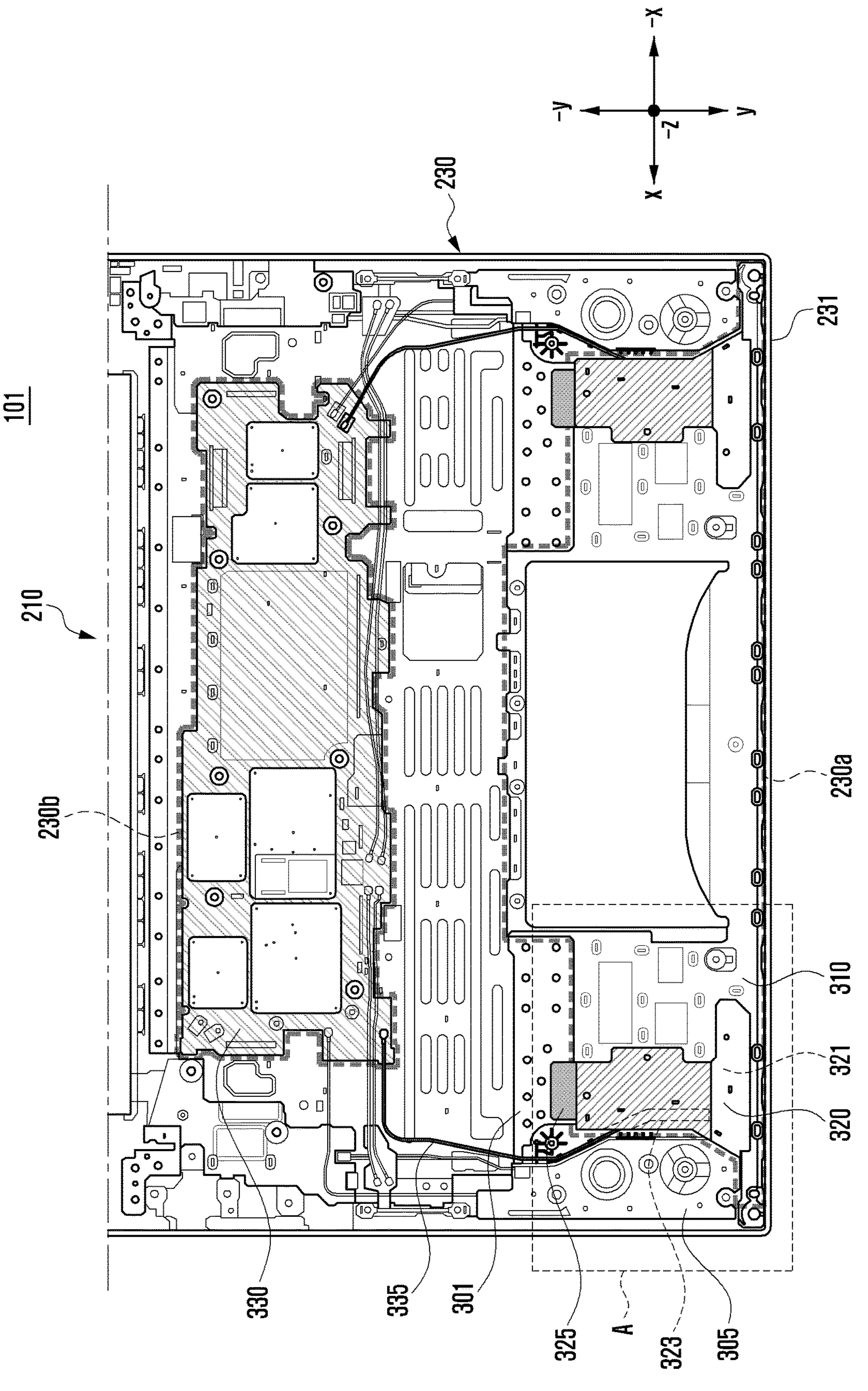
FIG. 3 is a plan view of a main body of the electronic device of FIG. 2 when viewed in one direction according to an embodiment of the disclosure.
Figure 4:
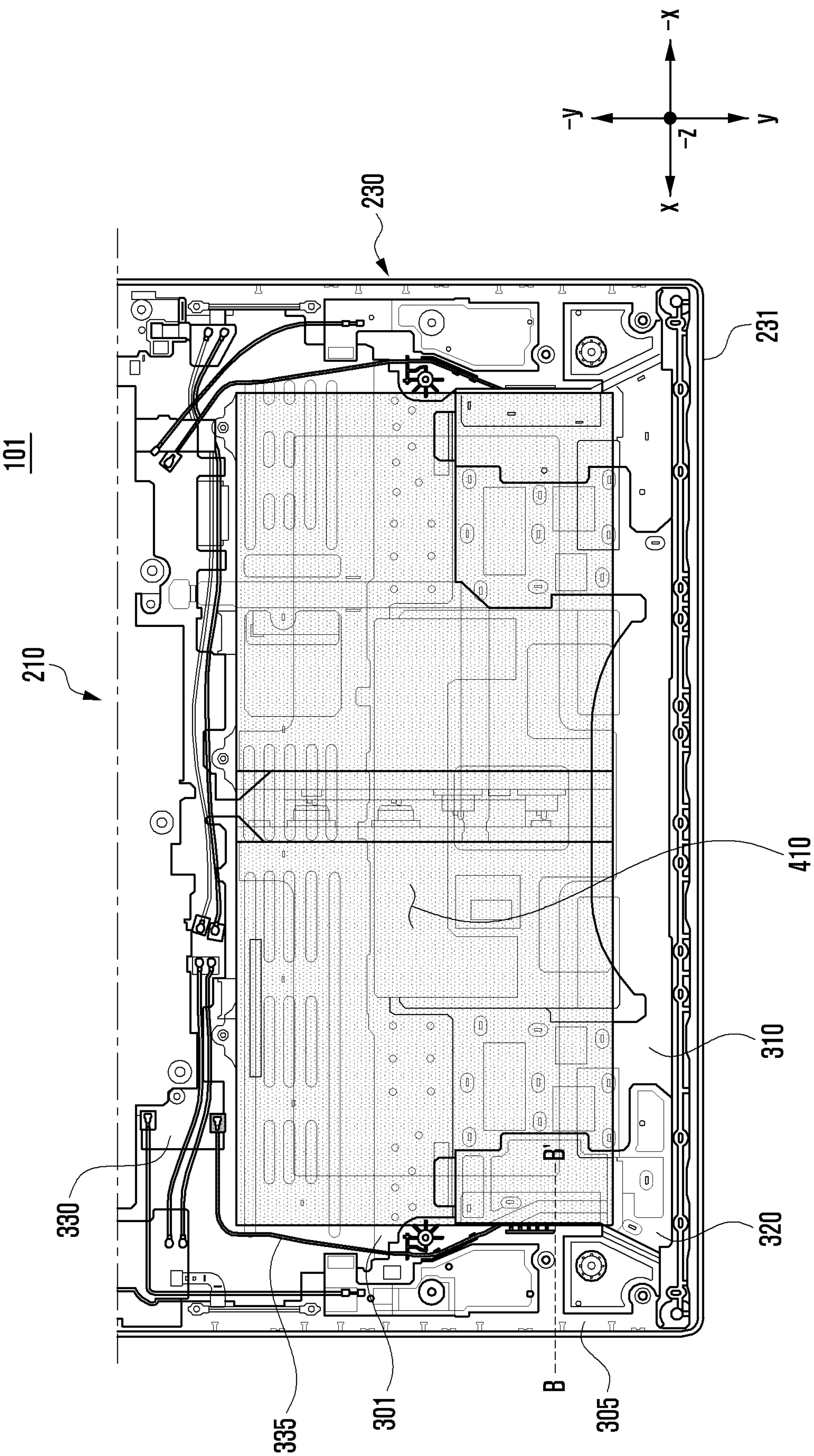
FIG. 4 is a plan view of the electronic device of FIG. 3 while the electronic device includes a battery, according to an embodiment of the disclosure.

FIG. 3 is a plan view of a main body of the electronic device of FIG. 2 when viewed in one direction according to an embodiment of the disclosure. FIG. 4 is a plan view of the electronic device of FIG. 3 while the electronic device includes a battery.

According to an embodiment, FIG. 3 and FIG. 4 may be plan views schematically illustrating the inner configuration of the main body 210 when viewed in one direction (e.g., the −z-axis direction) when the second surface 235 (e.g., lower surface or rear plate illustrated in FIG. 2) has been removed from the main body 210 of the electronic device 101. The electronic device 101 of FIG. 4 may be a plan view further including the battery 410 in the embodiment of FIG. 3.

The electronic device 101 of FIG. 3 and FIG. 4 may include components disclosed in the electronic device 101 illustrated in FIG. 1 or FIG. 2. In the descriptions of FIG. 3 and FIG. 4, identical reference numerals may be assigned to the same components as those in the embodiment of the electronic device 101 illustrated in FIG. 1 or FIG. 2, and redundant descriptions thereof may be omitted.

Referring to FIG. 3 and FIG. 4, the electronic device 101 (e.g., the main body 210) according to an embodiment of the disclosure may include the housing 230, a conductive plate 301, a non-conductive plate 305, a reinforcing member 310, an antenna module 320, a printed circuit board 330, and/or the battery 410.

According to an embodiment, the housing 230 may form the exterior of the main body 210 of the electronic device 101. The first surface 231 of the housing 230 may include the conductive plate 301 and/or the non-conductive plate 305.

According to an embodiment, the conductive plate 301 may constitute all or some of the first surface 231 of the housing 230. The conductive plate 301 may be at least partially disposed on the inner side of the first surface 231. The conductive plate 301 may include metal such as aluminum, stainless steel, and/or magnesium.

According to an embodiment, the non-conductive plate 305 may constitute all or some of the first surface 231 of the housing 230. The non-conductive plate 305 may be at least partially disposed at the outer side of the first surface 231. The non-conductive plate 305 may include a dielectric (e.g., insulator) material such as polycarbonate, polyimide, plastic, polymer, and/or ceramic.

According to an embodiment, the reinforcing member 310 may be disposed at a first part 230*a* of the first surface 231 of the housing 230. The reinforcing member 310 may be disposed at the inner surface of the first surface 231 of the housing 230. For example, the reinforcing member 310 may be disposed at the inner surface (e.g., the −z-axis direction) of the non-conductive plate 305, which is a part of the housing 230. According to another embodiment, the reinforcing member 310 may be disposed at the outer side (e.g., the y-axis direction) of the conductive plate 301, which is a part of the housing 230.

According to an embodiment, the reinforcing member 310 may have a predetermined thickness to secure the rigidity of the electronic device 101. The reinforcing member 310 may include a non-conductive injection-molded material. The reinforcing member 310 may include a dielectric (e.g., insulator) material identical to the non-conductive plate 305.

According to an embodiment, the antenna module 320 may be disposed at the inner surface (e.g., the −z-axis direction) of the reinforcing member 310. The antenna module 320 may be disposed between the reinforcing member 310 and the battery 410. The antenna module 320 may be electrically connected to the printed circuit board 330 by using a signal connection member 335.

According to an embodiment, one surface (e.g., in the z-axis direction) of the antenna module 320 may include a ground layer 321. The ground layer 321 is entirely formed on one surface (e.g., rear surface) of the antenna module 320. The ground layer 321 may be partially formed along the outer side (e.g., edge) of one surface of the antenna module 320 and may be implemented as a patterned conductive line.

The ground layer 321 may be made with, for example, a conductive metal (e.g., a copper foil).

According to an embodiment, a first area 323 of the ground layer 321 of the antenna module 320 may be coupled to a part of the signal connection member 335 electrically connected to the printed circuit board 330. For example, the first area 323 of the ground layer 321 may be electrically connected to a conductive part (e.g., a conductive part 335*a* in FIG. 8) of the signal connection member 335. A second area 325 of the ground layer 321 of the antenna module 320 may be electrically connected to the conductive plate 301. The second area 325 may be electrically connected to the conductive plate 301 so that the ground area of the antenna module 320 can be extended.

According to an embodiment, the antenna module 320 may be electrically connected to a processor and/or a wireless communication module (e.g., the processor 120 and/or the wireless communication module 192 in FIG. 1) arranged at the printed circuit board 330 by using the signal connection member 335. The antenna module 320 may perform short-range communication and/or long-range communication with an external electronic device (e.g., an electronic device 102, 104, and 108 in FIG. 1) or wirelessly transmit/receive power needed for charging thereto/therefrom. The antenna module 320 may include, for example, a near field communication (NFC) antenna, a wireless-charging antenna, and/or a magnetic secure transmission (MST) antenna. The antenna module 320 is not limited to antennas described above and may further include antennas for global positioning system (GPS), Wi-Fi, long-term evolution (LTE), Bluetooth, and/or mmWave communication.

According to an embodiment, the signal connection member 335 may electrically connect the antenna module 320 and the printed circuit board 330. The signal connection member 335 may be a coaxial cable including, for example, an outer coating portion and a conductive part (e.g., the conductive part 335*a* in FIG. 8). The signal connection member 335 is not limited to examples described above and may include a flexible printed circuit board (FPCB) or FPCB type RF cable (FRC).

According to an embodiment, the printed circuit board 330 may be disposed at a second part 230*b* different from the first part 230*a* of the housing 230. The printed circuit board 330 may be disposed at the inner surface of the first surface 231 of the housing 230. For example, the printed circuit board 330 may be disposed at the inner surface (e.g., the −z-axis direction) of the conductive plate 301, which is a part of the housing 230. According to another embodiment, the printed circuit board 330 may be disposed at the inner surface (e.g., the −z-axis direction) of the non-conductive plate 305, which is a part of the housing 230.

According to an embodiment, the processor 120, the memory 130, the sensor module 176, the interface 177, the power management module 188, and/or the communication module 190, illustrated in FIG. 1, may be arranged on the printed circuit board 330.

According to an embodiment, a first end of the signal connection member 335 may be electrically connected to the antenna module 320, and a second end may be electrically connected to the printed circuit board 330. For example, the antenna module 320 may be electrically connected to the processor 120 and/or the wireless communication module 192 arranged on the printed circuit board 330 via the signal connection member 335 and may perform as an antenna.

Referring to FIG. 4, the battery 410 may cover at least a part of the reinforcing member 310, the antenna module 320, and/or the conductive plate 301.

According to an embodiment, the battery 410 may supply power to at least one component of the electronic device 101. The battery 410 may include, for example, a non-rechargeable primary battery, a rechargeable secondary battery, or a fuel cell. At least a part of the battery 410 may be disposed on substantially the same plane as the printed circuit board 330.

Figure 5:
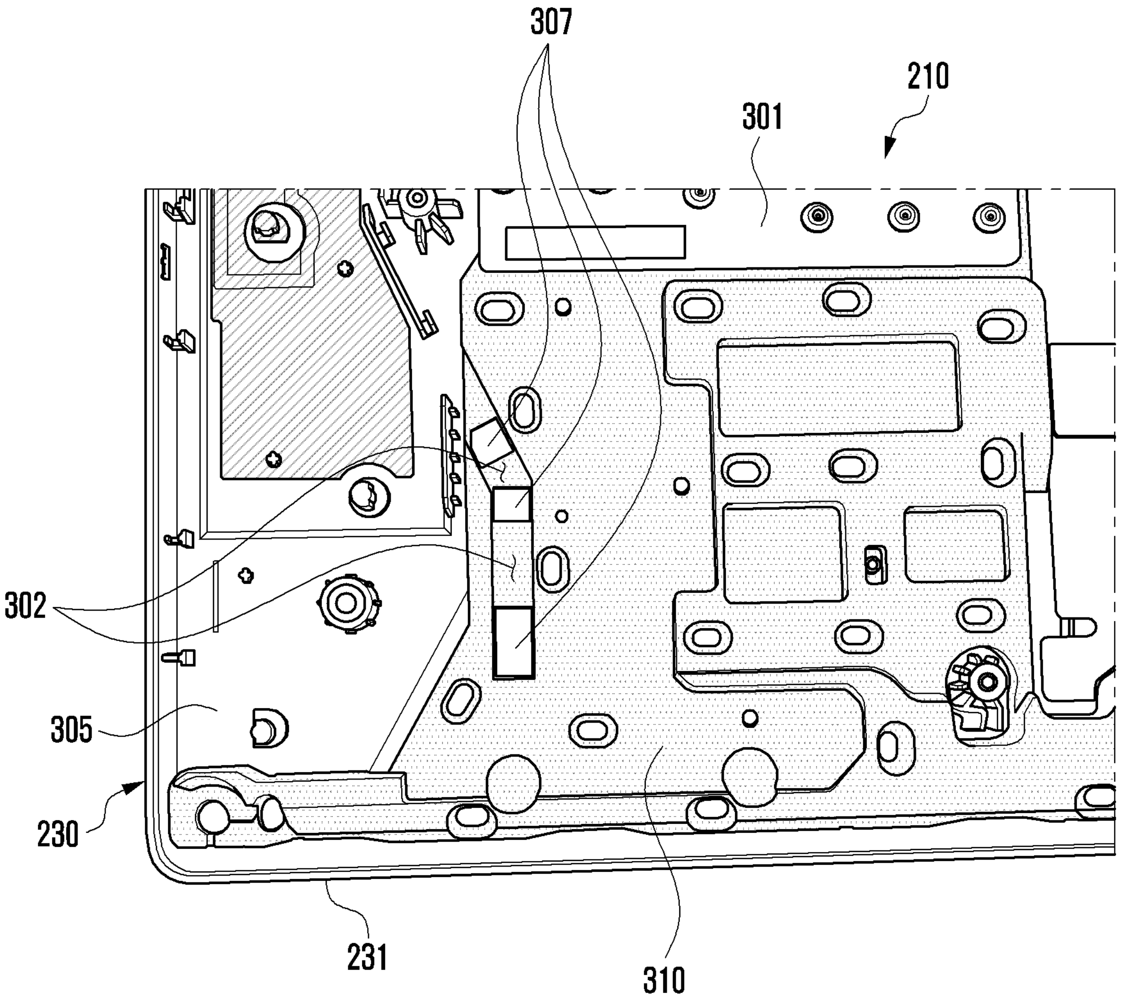
FIG. 5 is a schematic enlarged view of area A of the electronic device of FIG. 3 according to an embodiment of the disclosure.

FIG. 5 is a schematic enlarged view of area A of the electronic device of FIG. 3 according to an embodiment of the disclosure.

Referring to FIG. 5, the reinforcing member 310 (e.g., made of a non-conductive injection-molded material) according to an embodiment of the disclosure may include a groove 302 (also referred to as, for example, a seating part) extending by a predetermined length. The groove 302 may be a concave groove having a predetermined depth and formed at a portion of the exterior of the reinforcing member 310. The depth of the groove 302 may be determined according to the thickness of the signal connection member 335 and the thickness of at least one solder (e.g., at least one solder 610 in FIG. 6).

According to an embodiment, the groove 302 (e.g., the seating part) may allow a part of the signal connection member 335 to be seated. The groove 302 may form the route in which at least a part of the signal connection member 335 is disposed. That is, a part of the signal connection member 335 may be disposed in the groove 302. The groove 302 may include at least one opening 307 (e.g., hole).

According to an embodiment, a plurality of the antenna modules 320 may be arranged on the reinforcing member 310. According to an embodiment, the reinforcing member 310 including the groove 302 may be disposed to correspond to the number of the antenna modules 320. For example, when the electronic device 101 according to an embodiment of the disclosure includes a plurality of antenna modules 320, a plurality of reinforcing members 310 including the groove 302 may be arranged.

Figure 6:
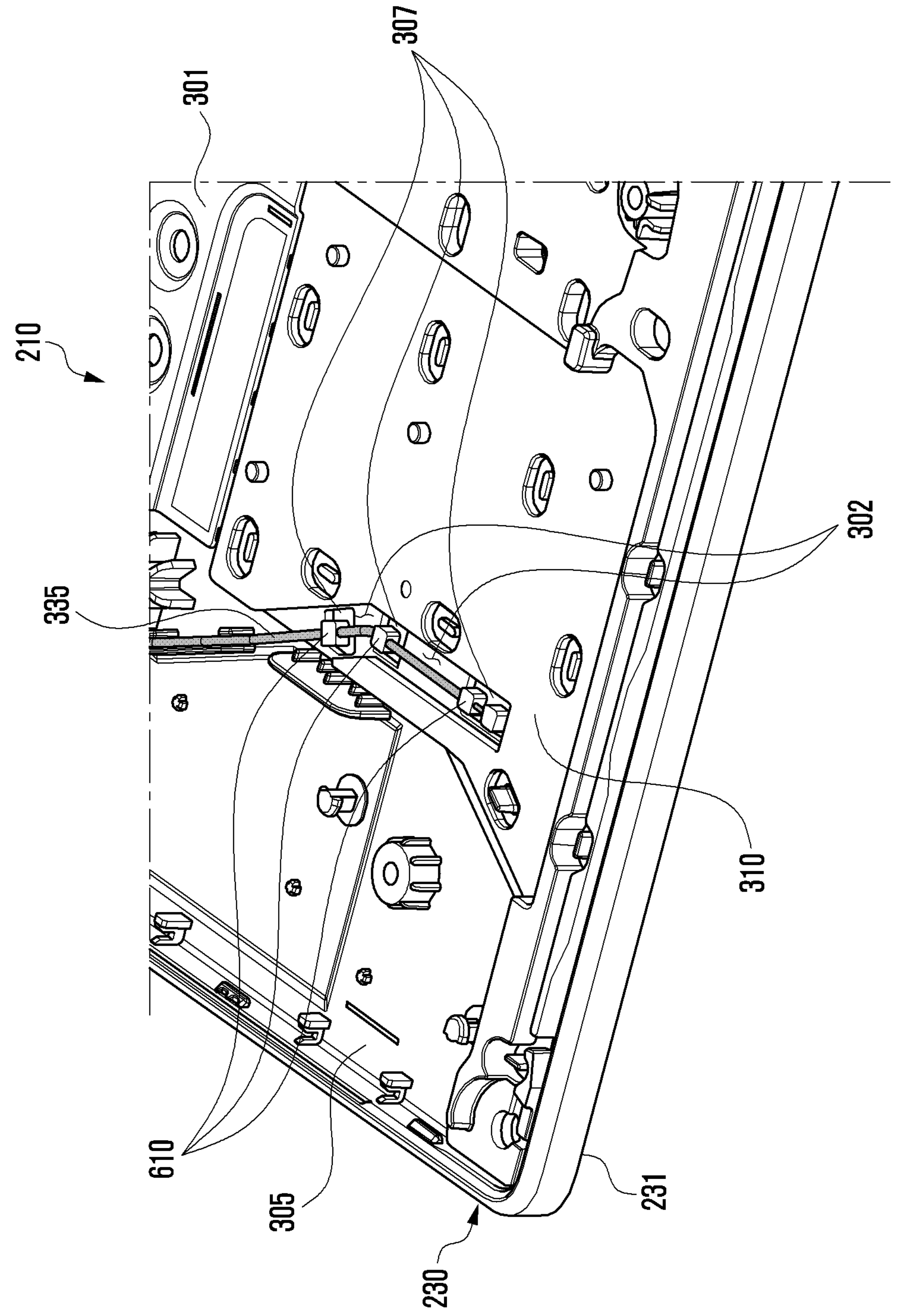
FIG. 6 is a view illustrating a state in which a signal connection member and a solder are arranged in a groove of the reinforcing member of FIG. 5 according to an embodiment of the disclosure.

FIG. 6 is a view illustrating a state in which a signal connection member and a solder are arranged in a groove of the reinforcing member of FIG. 5 according to an embodiment of the disclosure.

According to an embodiment, for ease of explanation, the antenna module 320 of FIG. 3 is not illustrated in FIG. 6.

Referring to FIG. 6, a part of the signal connection member 335 may be seated and disposed in the groove 302 of the reinforcing member 310 according to certain embodiments of the disclosure. At least a part (e.g., outer coating portion) of the signal connection member 335 may be peeled off, and at least part of the conductive part (e.g., the conductive part 335*a* in FIG. 8) may be exposed. The part of the conductive part 335*a* that is exposed may be electrically connected to the first area 323 of the ground layer 321 of the antenna module 320 through at least one solder 610 as illustrated in FIG. 6.

According to an embodiment, the at least one solder 610 configured to electrically connecting the exposed conductive part (e.g., the conductive part 335*a* in FIG. 8) of the signal connection member 335 to the first area 323 of the ground layer 321 of the antenna module 320 may be disposed in the groove 302. In another embodiment, the at least one solder 610 may be disposed in at least one opening 307 (e.g., hole) provided in the groove 302 of the reinforcing member 310.

Figure 7:
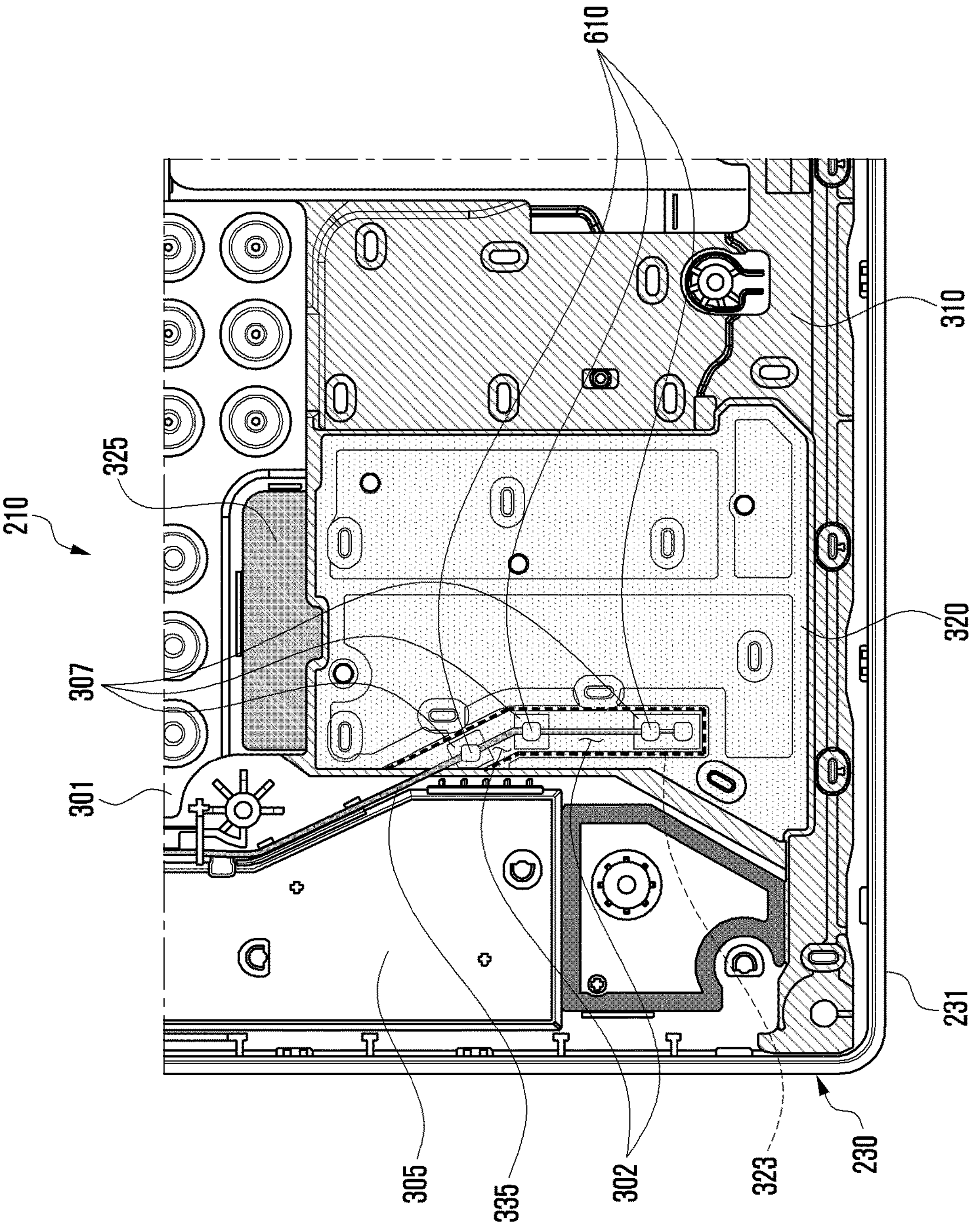
FIG. 7 is a view illustrating a state in which an antenna module and a signal connection member are arranged at the reinforcing member illustrated in FIG. 5 and FIG. 6 according to an embodiment of the disclosure.

FIG. 7 is a view illustrating a state in which an antenna module and a signal connection member are arranged at the reinforcing member illustrated in FIG. 5 and FIG. 6 according to an embodiment of the disclosure.

Referring to FIG. 7, the antenna module 320 according to an embodiment of the disclosure may be electrically connected to the printed circuit board 330 by using the signal connection member 335. At least a part of the signal connection member 335 may be disposed in the groove 302 formed at the reinforcing member 310. A part of the signal connection member 335 may be disposed between the reinforcing member 310 and the antenna module 320. Since a part of the signal connection member 335 is disposed between the reinforcing member 310 and the antenna module 320, the part of the signal connection member 335 and a contact point (e.g., the solder 610) of the first area 323 of the ground layer 321 may not be exposed and thus be protected.

According to an embodiment, the first area 323 of the ground layer 321 of the antenna module 320 may be electrically connected to a part of the signal connection member 335 (e.g., the conductive part 335*a* in FIG. 8) by using at least one solder 610 at at least one opening 307 and/or the groove 302 formed in the reinforcing member 310. The second area 325 of the ground layer 321 of the antenna module 320 may be electrically connected to the conductive plate 301.

Figure 8:
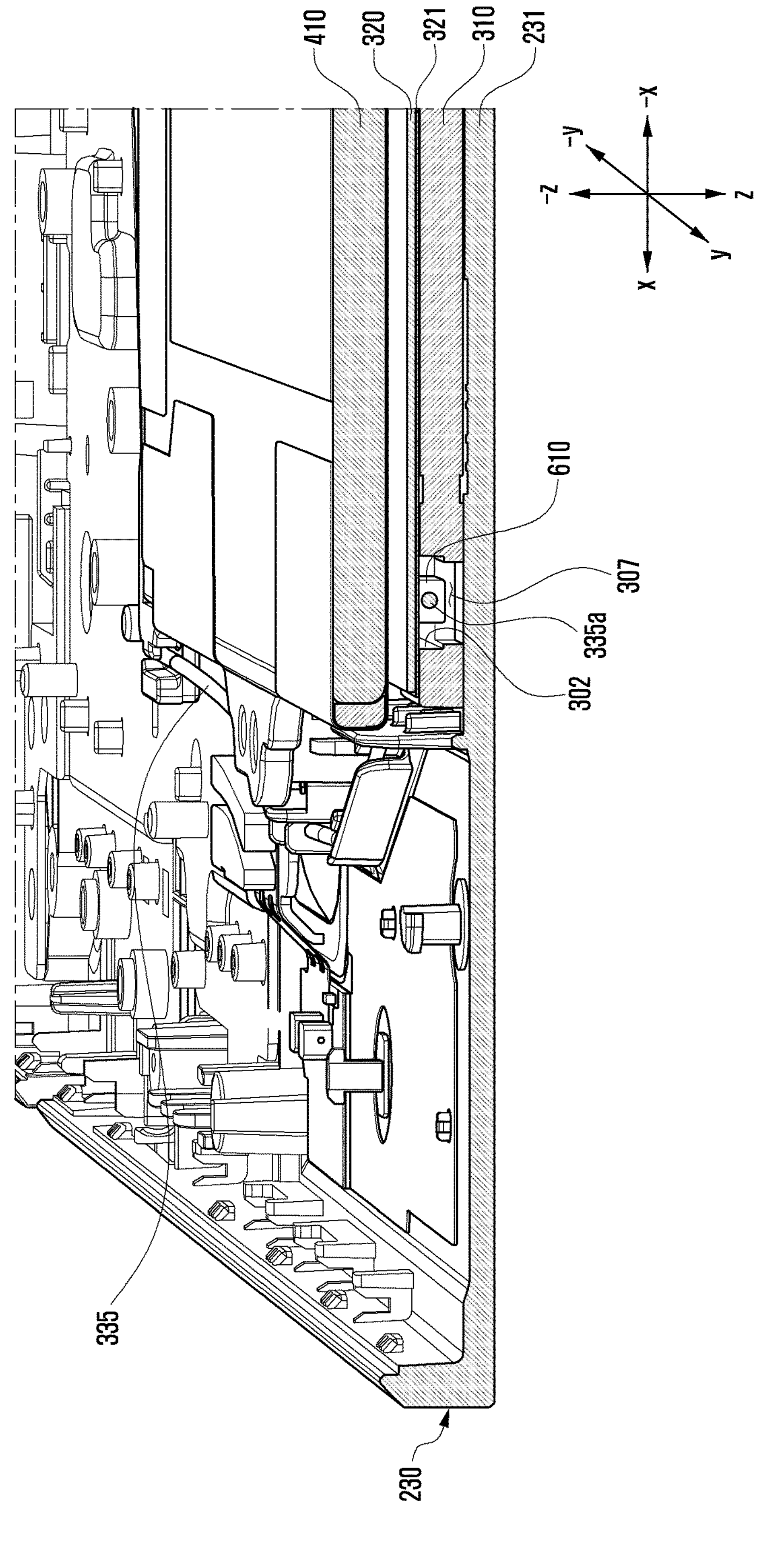
FIG. 8 is a schematic cross-section view of the electronic device illustrated in FIG. 4, taken along line B-B', according to an embodiment of the disclosure.

FIG. 8 is a schematic cross-section view of the electronic device illustrated in FIG. 4, taken along line B-B', according to an embodiment of the disclosure.

Referring to FIG. 8, in the electronic device 101 according to an embodiment of the disclosure, the reinforcing member 310 may be disposed in a first direction (e.g., the −z-axis direction) of the first surface 231 of the housing 230.

According to an embodiment, the reinforcing member 310 may include at least one opening 307 and/or the groove 302. The conductive part 335*a* of the signal connection member 335 may be electrically connected to the ground layer 321 (e.g., the first area 323 in FIG. 3) of the antenna module 320 by using at least one solder 610 in the groove 302 and/or in at least one opening 307.

According to an embodiment, the antenna module 320 may be disposed in the first direction (e.g., the −z-axis direction) of the reinforcing member 310. A part of the signal connection member 335 may be disposed between the reinforcing member 310 and the antenna module 320. The battery 410 may be disposed in the first direction (e.g., the −z-axis direction) of the antenna module 320 and separated from the antenna module 320 by a predetermined interval.

According to an embodiment, a part of the signal connection member 335 and the contact point (e.g., the solder 610) may not be exposed to the outside. Since a part of the signal connection member 335 and the contact point (e.g., the solder 610) are arranged between the reinforcing member 310 and the antenna module 320, the part of the signal connection member 335 and the contact point (e.g., the solder 610) may be prevented from directly contacting the battery 410.

According to an embodiment, since a part of the signal connection member 335 and the contact point (e.g., the solder 610) are arranged between the reinforcing member 310 and the antenna module 320, a gap between the antenna module 320 and the battery 410 may be reduced. When the gap between the antenna module 320 and the battery 410 is reduced, the thickness of the electronic device 101 may decrease.

In an embodiment of the disclosure, the groove 302 (e.g., seating part) extending by a predetermined length is formed in the reinforcing member 310 (e.g., made of a non-conductive injection-molded material) disposed at one surface of the antenna module 320, a part of the signal connection member 335 configured to electrically connect the antenna module 320 and the printed circuit board 330 extends through the groove 302, and the conductive part 335*a* of the signal connection member 335 and the first area 323 of the ground layer 321 of the antenna module 320 are connected in the groove 302 and/or at least one opening 307 by using at least one solder 610, so that the rigidity of the electronic device 101 and the radiation performance of the antenna module 320 can be secured without affecting other electric components (e.g., the battery 410).

An electronic device 101 according to an embodiment of the disclosure may be configured to include a housing 230 including a conductive plate 301 and a non-conductive plate 305, a reinforcing member 310 disposed at a first part inside the housing 230 and including a groove 302 of a predetermined length, a printed circuit board 330 disposed at a second part 230*b* different from the first part 230*a* inside the housing 230, an antenna module 320 disposed at one surface of the reinforcing member 310 and including a ground layer 321 at the rear surface thereof, and a signal connection member 335 configured to electrically connect the printed circuit board 330 and the antenna module 320, wherein a first part of the signal connection member 335 extends through the groove 302 and is electrically connected to a first area 323 of the ground layer 321 in the groove 302 by using a solder 610.

According to an embodiment, the reinforcing member 310 may be disposed at one surface of the non-conductive plate 305 of the housing 230.

According to an embodiment, the second area 325 of the ground layer 321 may be electrically connected to the conductive plate 301.

According to an embodiment, the antenna module 320 may be electrically connected to a wireless communication module 192 or a processor 120 arranged on the printed circuit board 330.

According to an embodiment, the signal connection member 335 may include one of a coaxial cable, flexible printed circuit board (FPCB), or FPCB type RF cable (FRC).

According to an embodiment, the printed circuit board 330 may be disposed at one surface of the conductive plate 301 of the housing 230.

According to an embodiment, the battery 410 configured to cover at least a part of the conductive plate 301, the antenna module 320, and the reinforcing member 310 may be further included.

According to an embodiment, the battery 410 may be disposed to be spaced a predetermined distance apart from the antenna module 320.

According to an embodiment, the antenna module 320 may be disposed between the battery 410 and a second part of the signal connection member 335.

According to an embodiment, the groove 302 may include at least one opening 307, and a third part of the signal connection member 335 and the first area 323 of the ground layer 321 may be electrically connected at the at least one opening 307 by using the solder 610.

According to an embodiment, the first part of the signal connection member 335 may be disposed between the reinforcing member 310 and the antenna module 320.

An electronic device 101 according to an embodiment of the disclosure may be configured to include a housing 230 including a conductive plate 301 and a non-conductive plate 305, a reinforcing member 310 disposed at a first part 230*a* inside the housing 230 and including a groove 302 of a predetermined length, a printed circuit board 330 disposed at a second part 230*b* different from the first part 230*a* inside the housing 230, an antenna module 320 disposed at one surface of the reinforcing member 310 and including a ground layer 321 at the rear surface thereof, and a signal connection member 335 configured to electrically connect the printed circuit board 330 and the antenna module 320, wherein a first part of the signal connection member 335 extends through the groove 302 and is electrically connected to a first area 323 of the ground layer 321 in the groove 302 by using a solder 610, and the first part of the signal connection member 335 is disposed between the reinforcing member 310 and the antenna module 320.

According to an embodiment, a second area 325 of the ground layer 321 may be electrically connected to the conductive plate 301.

According to an embodiment, the antenna module 320 may be electrically connected to a wireless communication module 192 or a processor 120 arranged on the printed circuit board 330.

According to an embodiment, the signal connection member 335 may include one of a coaxial cable, a flexible printed circuit board (FPCB), or a FPCB type RF cable (FRC).

According to an embodiment, the printed circuit board 330 may be disposed at one surface of the conductive plate 301 of the housing 230.

According to an embodiment, the battery 410 configured to cover at least a part of the conductive plate 301, the antenna module 320, and the reinforcing member 310 may be further included.

According to an embodiment, the battery 410 may be disposed to be spaced a predetermined distance apart from the antenna module 320.

According to an embodiment, the antenna module 320 may be disposed between the battery 410 and a second part of the signal connection member 335.

According to an embodiment, the groove 302 may be configured to include at least one opening 307, and a third part of the signal connection member 335 and the first area 323 of the ground layer 321 may be electrically connected at the at least one opening 307 by using the solder 610.

Hereinbefore, the disclosure has been described according to various embodiments of the disclosure. However, it is reasonable that modifications and changes made by those skilled in the art, to which the disclosure belongs, without departing from the technical sprit of the disclosure are included in the disclosure.

The invention claimed is:

1. An electronic device comprising:

a housing including a conductive plate and a non-conductive plate;

a reinforcing member disposed at a first part inside the housing and including a groove of a predetermined length;

a printed circuit board disposed at a second part different from the first part inside the housing;

an antenna module disposed at one surface of the reinforcing member and including a ground layer at a rear surface thereof; and a signal connection member configured to electrically connect the printed circuit board and the antenna module, wherein a first part of the signal connection member extends through the groove and is electrically connected to a first area of the ground layer in the groove by using a solder.

2. The electronic device of claim 1, wherein the reinforcing member is disposed at one surface of the non-conductive plate of the housing.

3. The electronic device of claim 1, wherein a second area of the ground layer is electrically connected to the conductive plate.

4. The electronic device of claim 1, wherein the antenna module is electrically connected to a wireless communication module or a processor arranged on the printed circuit board.

5. The electronic device of claim 1, wherein the signal connection member includes a coaxial cable, a flexible printed circuit board (FPCB), and/or a FPCB type RF cable (FRC).

6. The electronic device of claim 1, wherein the printed circuit board is disposed at one surface of the conductive plate of the housing.

7. The electronic device of claim 1, further comprising a battery configured to cover at least a part of the conductive plate, the antenna module, and the reinforcing member.

8. The electronic device of claim 7, wherein the battery is disposed to be spaced a predetermined distance apart from the antenna module.

9. The electronic device of claim 7, wherein the antenna module is disposed between the battery and a second part of the signal connection member.

10. The electronic device of claim 1, wherein the groove includes at least one opening, and wherein a third part of the signal connection member and the first area of the ground layer are electrically connected at the at least one opening by using the solder.

11. The electronic device of claim 1, wherein the first part of the signal connection member is disposed between the reinforcing member and the antenna module.

12. An electronic device comprising:

a housing including a conductive plate and a non-conductive plate;

a reinforcing member disposed at a first part inside the housing and including a groove of a predetermined length;

a printed circuit board disposed at a second part different from the first part inside the housing;

an antenna module disposed at one surface of the reinforcing member and including a ground layer at a rear surface thereof; and a signal connection member configured to electrically connect the printed circuit board and the antenna module, wherein a first part of the signal connection member extends through the groove and is electrically connected to a first area of the ground layer in the groove by using a solder, and wherein the first part of the signal connection member is disposed between the reinforcing member and the antenna module.

13. The electronic device of claim 12, wherein a second area of the ground layer is electrically connected to the conductive plate.

14. The electronic device of claim 12, wherein the antenna module is electrically connected to a wireless communication module or a processor arranged on the printed circuit board.

15. The electronic device of claim 12, wherein the signal connection member includes a coaxial cable, a flexible printed circuit board (FPCB), and/or a FPCB type RF cable (FRC).

16. The electronic device of claim 12, wherein the printed circuit board is disposed at one surface of the conductive plate of the housing.

17. The electronic device of claim 12, further comprising a battery configured to cover at least a part of the conductive plate, the antenna module, and the reinforcing member.

18. The electronic device of claim 17, wherein the battery is disposed to be spaced a predetermined distance apart from the antenna module.

19. The electronic device of claim 17, wherein the antenna module is disposed between the battery and a second part of the signal connection member.

20. The electronic device of claim 12, wherein the groove includes at least one opening, and wherein a third part of the signal connection member and the first area of the ground layer are electrically connected at the at least one opening by using the solder.

* * * * *